United States Patent
Chen

(10) Patent No.: US 9,903,419 B2
(45) Date of Patent: Feb. 27, 2018

(54) DRIVING HEAD-CHANGEABLE TOOL

(71) Applicant: YUAN LI HSING INDUSTRIAL CO., LTD., Taichung (TW)

(72) Inventor: Chia-Yi Chen, Taichung (TW)

(73) Assignee: YUAN LI HSING INDUSTRIAL CO., LTD., Taichung (TW)

( * ) Notice: Subject to any disclaimer, the term of this patent is extended or adjusted under 35 U.S.C. 154(b) by 115 days.

(21) Appl. No.: 15/003,550

(22) Filed: Jan. 21, 2016

(65) Prior Publication Data
US 2016/0138657 A1 May 19, 2016

Related U.S. Application Data

(63) Continuation-in-part of application No. 14/255,472, filed on Apr. 17, 2014, now abandoned.

(51) Int. Cl.
| | |
|---|---|
| *F16D 3/18* | (2006.01) |
| *F16D 1/108* | (2006.01) |
| *B25B 23/00* | (2006.01) |
| *F16B 21/08* | (2006.01) |
| *F16D 1/10* | (2006.01) |

(52) U.S. Cl.
CPC .......... *F16D 1/108* (2013.01); *B25B 23/0014* (2013.01); *F16B 21/08* (2013.01); *F16D 3/185* (2013.01); *F16D 2001/102* (2013.01); *Y10S 464/901* (2013.01); *Y10T 403/7005* (2015.01); *Y10T 403/7015* (2015.01)

(58) Field of Classification Search
CPC ...... F16D 1/08; F16D 3/185; F16D 2001/102; F16B 21/02; F16B 21/08; B25B 23/0014; Y10S 464/901; Y10T 403/7005; Y10T 403/7015

USPC ........ 464/106, 158, 159, 901; 403/348, 359, 403/353; 81/177.75, 177.85
See application file for complete search history.

(56) References Cited

U.S. PATENT DOCUMENTS

| 1,070,233 | A | | 8/1913 | Curtis | |
|---|---|---|---|---|---|
| 2,317,729 | A | * | 4/1943 | Bruno | F16L 37/252 403/348 X |

(Continued)

FOREIGN PATENT DOCUMENTS

| TW | 566284 U | 12/2003 |
|---|---|---|
| TW | M357344 U | 5/2009 |

*Primary Examiner* — Gregory J Binda
(74) *Attorney, Agent, or Firm* — Muncy, Geissler, Olds & Lowe, P.C.

(57) ABSTRACT

A driving head-changeable tool includes an outer sleeve, an inner sleeve and a limitation mechanism. The outer sleeve defines a central axis and has an end peripheral edge having corner portions and blocking flanges therebetween and a circumferential sliding slot. The inner sleeve is rotatably sleeved by the outer sleeve and has first and second connecting ends. The first connecting end has axial concaves. The limitation mechanism is mounted to the inner sleeve and extends into and movable relative to the sliding slot. When the limitation mechanism is located in a lock position, the outer and inner sleeves are unrotatable relative to each other and each concave overlaps axially with one of the blocking flanges; when the limitation mechanism is located in a release position, the outer and inner sleeves are rotatable relative to each other and each concave corresponds to one of the corner portions.

9 Claims, 6 Drawing Sheets

(56) References Cited

U.S. PATENT DOCUMENTS

| | | | |
|---|---|---|---|
| 4,114,401 A * | 9/1978 | Van Hoose | F16D 3/2052 |
| | | | 81/177.75 X |
| 6,076,436 A | 6/2000 | Farley | |
| 9,205,543 B1 * | 12/2015 | Chen | B25B 23/0035 |
| 2016/0052111 A1 * | 2/2016 | Chen | F16D 3/185 |

* cited by examiner

DRIVING HEAD-CHANGEABLE TOOL

The present invention is a continuation-in-part of application Ser. No. 14/255,472, filed Apr. 17, 2014, now abandoned, the entire contents of which are hereby incorporated by reference.

BACKGROUND OF THE INVENTION

Field of the Invention

Description of the Prior Art

In conventional two-stage connecting heads, a polygonal ball head of a supporting rod is received in a receiving slot of a working head, and the shape of the receiving slot is polygonal to correspond to the polygonal ball head. Through a connecting structure, when the supporting rod is pressed, it can be fixedly disposed to the working head; and when the supporting rod is pulled, it is pivotally swingable relative to the working head. Such type of conventions is disclosed in TW566284 and TWM357344.

In TW566284, because the inner wall of the receiving slot is polygonal, the inner wall of the receiving slot and the polygonal ball head are in face-face contact. When an electronic driving device drives the supporting rod to rotate relative to the working head in high speed, the polygonal ball head and the receiving slot may be deadlocked due to great friction, and the electronic driving device and the two-stage connecting head may be damaged. In addition, even if the polygonal ball head and the receiving slot are not deadlocked, the friction during the process wastes energy, causes low efficiency and troubles users.

In TWM357344, a lateral wall of the receiving slot has a plurality of protruding edges corresponding to the polygonal ball head. The protruding edges are arranged on the lateral wall of the receiving slot in intervals. A number of the protruding edges correspond to a number of angles of the polygonal ball head. Each protruding edge has an arc connecting face provided for connecting to the polygonal ball head so as to allow the supporting rod to rotate co-movably with the working head and improve the deficiencies of TW566284.

However, no matter in TW566284 or TWM357344, a blocking flange which can restrict each corner portion of the polygonal ball head is not disposed, so during high-speed working process, the driving head disassembles easily, and problems such as poor efficiency, interruption and danger may happen during the process.

U.S. Pat. No. 1,070,233 discloses that the inner sleeve is provided with a through hole which is for the shaft to insert therein and is much less than the opening of the outer sleeve in radial dimension, so that the shaft within the inner sleeve is comovable with the inner sleeve and cannot engage with the outer sleeve, and the inner sleeve cannot used for a driving head tool having a polygonal ball head. In fact, the shaft is fixedly integrated with the inner sleeve and cannot be changed.

The present invention is, therefore, arisen to obviate or at least mitigate the above-mentioned disadvantages.

SUMMARY OF THE INVENTION

The main object of the present invention is to provide a driving head-changeable tool which can prevent a driving head from disassembling and is convenient for exchanging the driving head. The driving head which is pivotally swingable has better efficiency and has less components and simple structure which can be easily mounted.

To achieve the above and other objects, the present invention provides a driving head-changeable tool, including an outer sleeve, an inner sleeve and a limitation mechanism. The outer sleeve defines a central axis. The outer sleeve has an end peripheral edge and is circumferentially formed with a sliding slot. The end peripheral edge has a plurality of corner portions and a plurality of blocking flanges disposed between the corner portions. A distance from the corner portion to the central axis is larger than a distance from the blocking flange to the central axis. The inner sleeve is rotatable relative to the outer sleeve and is coaxially sleeved by the outer sleeve on the same axis and has a first connecting end and a second connecting end relative to the first connecting end along the central axis. An inner wall of the first connecting end has a plurality of concaves extending axially, and a distance from the concave to the central axis is larger than the distance from the blocking flange to the central axis. The limitation mechanism is mounted to the inner sleeve and extends into the sliding slot, and the limitation mechanism is operable to move relative to the sliding slot between a lock position and a release position; wherein, as viewed in an axial direction, when the limitation mechanism is located in the lock position, the outer sleeve and the inner sleeve are unrotatable relative to each other, and each concave overlaps with one of the blocking flanges; when the limitation mechanism is located in the release position, the outer sleeve and the inner sleeve are rotatable relative to each other, and each concave corresponds to one of the corner portions. The inner sleeve has a receiving hole defined by the inner wall of the first connecting end, the receiving hole has an opening toward the blocking flanges, a largest radial dimension of the opening which is defined from the concave to the central axis is larger than the distance from the blocking flange to the central axis.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
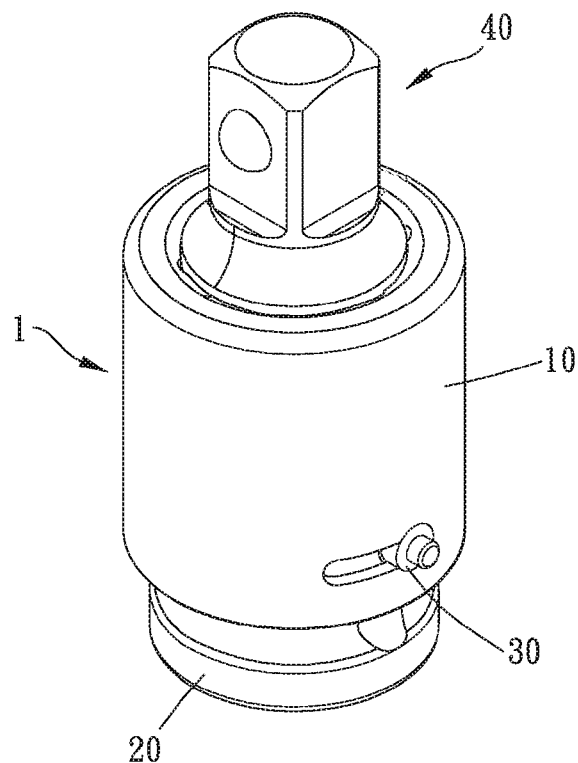
FIGS. 1 and 2 are stereograms showing a driving head-changeable tool in different configurations according to a preferable embodiment of the present invention.

Please refer to FIGS. 1 to 6 for a preferable embodiment of the present invention. A driving head-changeable tool 1 of the present invention includes an outer sleeve 10, an inner sleeve 20 and a limitation mechanism 30.

The outer sleeve 10 defines a central axis 11, and the outer sleeve 10 has an end peripheral edge 12 and is circumferentially formed with a sliding slot 13. The end peripheral edge 12 has a plurality of corner portions 14 and a plurality of blocking flanges 15 disposed between the corner portions 14. A distance D3 from the corner portion 14 to the central axis 11 is larger than a distance D1 from the blocking flange 15 to the central axis 11. Specifically, each blocking flange 15 is transversely connected between each two neighboring corner portions 14, and each corner portion 14 is recessed into the end peripheral edge 12 radially relative to the two neighboring blocking flanges 15. The corner portions 14 are corners, not limited to an included angle, for example, in this embodiment, though each corner portion 14 is an arc concave, it can also be a pointed concave. The corner portions 14 may be provided for a tool, such as a driving head, adapter, screwdriver or drill bit, to insert therein easily. The end peripheral edge 12 further includes a circular concave 16 to make the end peripheral edge 12 substantially a slanted or a stepped structure. The sliding slot 13 includes a large diameter slot 131 at an end and a small diameter slot 132 extending from the large diameter slot 131. Specifically, the large diameter slot 131 is substantially circular arc, and the small diameter slot 132 is substantially a long straight slot with equal width. Preferably, compared with the central axis 11, a radian of the sliding slot 13 extending circumferentially is determined in accordance with numbers of the corner portions 14 and the blocking flanges 15. For example, when the number of the corner portions 14 and the blocking flanges 15 is six, the radian of the sliding slot 13 may be 30 degree (however, may be over 30 degree) so as to control the relative positions of the outer sleeve 10 and the inner sleeve 20. An end of the inner sleeve 20 is formed with a polygonal slot 17. The polygonal slot 17 can be provided for a driving device to connect therein, and the driving device can be an electric driving device, a pneumatic driving device or a hand tool such as an open-ended wrench, a socket wrench or a screwdriver. Moreover, the polygonal slot 17 can be provided for tools such as driving heads, adapters, screwdrivers and various drill bits to insert therein.

Please further refer to FIGS. 7, 7A, 8 and 8A. The inner sleeve 20 is rotatably coaxially sleeved by the outer sleeve 10 and has a first connecting end 21 and a second connecting end 22 relative to the first connecting end 21 along the central axis 11. An inner wall of the first connecting end 21 is recessively formed with a plurality of concaves 23 extending axially. A distance R1 from the concave 23 to the central axis 11 is larger than the distance D1 from the blocking flange 15 to the central axis 11. The concaves 23 may be provided for a tool, such as a driving head, adapter, screwdriver or drill bit, to insert therein. The inner sleeve 20 is formed with a disposing hole 24 and has a limitation edge 25 extending radially inwardly from a hole edge of the disposing hole 24, and the limitation edge 25 may be provided for restricting the tool inserted therein. It is noted that if the first connecting end 21 and the end peripheral edge 12 are provided for connection to a driven member of screwdriver or drill bit, the polygonal slot 17 is provided for connecting to an electronic or pneumatic driving device. On the contrary, if the first connecting end 21 and the end peripheral edge 12 are provided for connection to an electronic or pneumatic driving device, the polygonal slot 17 is provided for connection to a driven member of screwdriver or drill bit.

Figure 2:
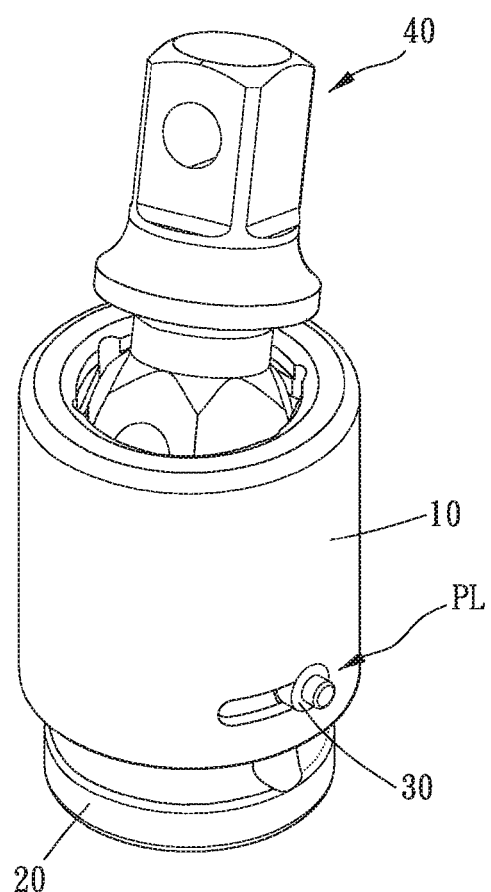
Figures 3, 4:
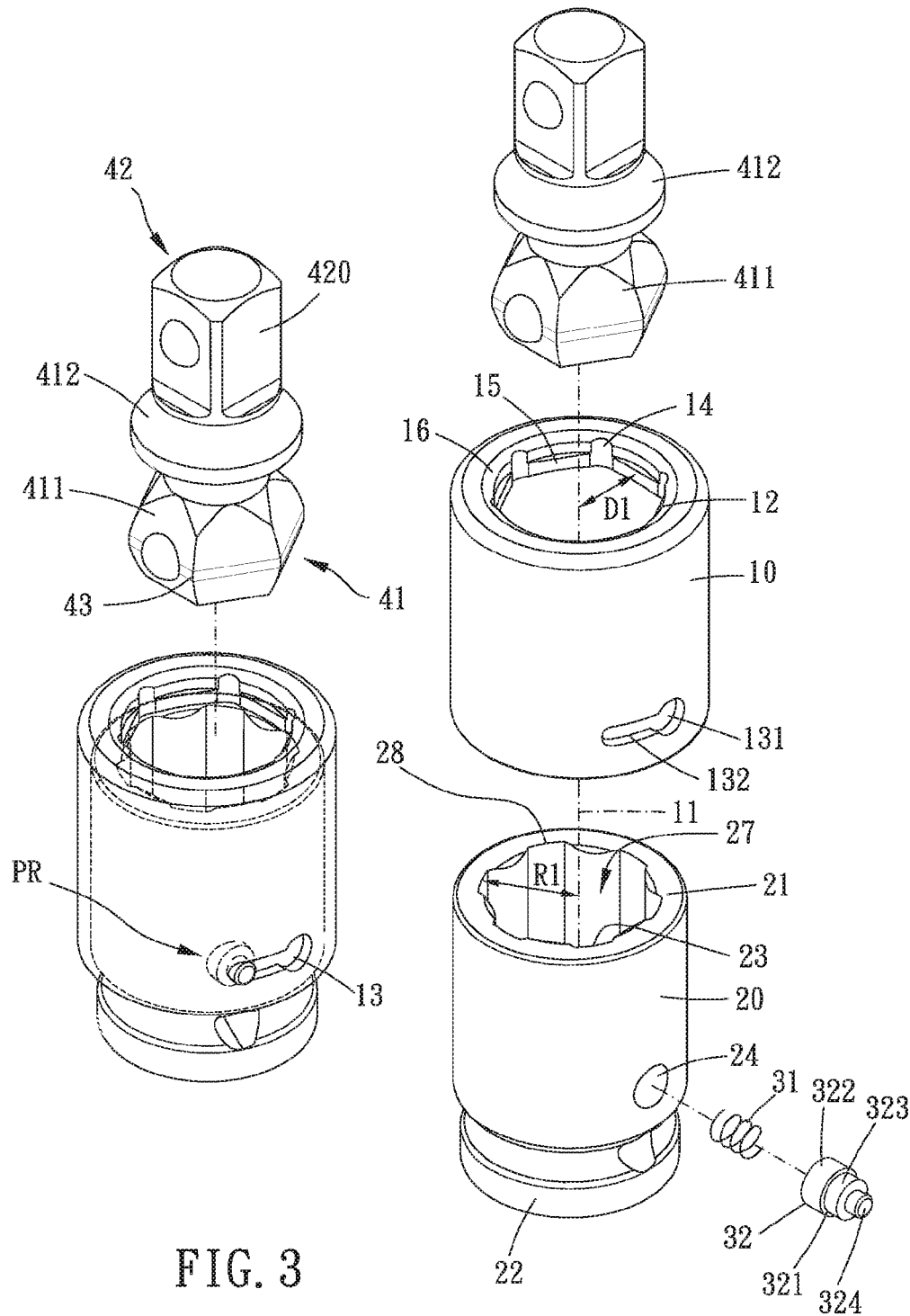
FIG. 3 is a drawing showing a driving head detached from sleeved inner and outer sleeves according to a preferable embodiment of the present invention.
FIG. 4 is a breakdown drawing of a driving head-changeable tool according to a preferable embodiment of the present invention.

The limitation mechanism 30 is mounted to the inner sleeve 20 radially and extends into the sliding slot 13. The limitation mechanism 30 is operable and located between a lock position PL (as shown in FIG. 2) and a release position PR (as shown in FIG. 3) relative to the sliding slot 30. Specifically, the limitation mechanism 30 includes an elastic member 31 disposed in the disposing hole 24 and an operating member 32. A peripheral face of the operating member 32 is formed with a limitation portion 321, and an end of the operating member 32 is inserted into the disposing hole 24 and abutted against the elastic member 31. The limitation portion 321 is disposed in the disposing hole 24 and restrictable by the limitation edge 25. More specifically, the operating member 32 hierarchically includes an inserting section 322, a large diameter section 323 and a small diameter section 324. A diameter of the inserting section 322 is larger than that of the large diameter section 323 and is formed with a stepped portion with the large diameter section 323. The stepped section acts as the limitation portion 321, and the inserting section 322 is inserted into the disposing hole 24. More specifically, the large diameter section 323 of the operating member 32 protrudes out of a peripheral face of the inner sleeve 20, and the small diameter section 324 extends from the large diameter section 323. The diameter of the large diameter section 323 is equal to or smaller than a width of the large diameter slot 131 and is larger than a width of the small diameter slot 132. A diameter of the small diameter section 324 is equal to or smaller than the width of the small diameter slot 132, wherein, as viewed in an axial direction, when the limitation mechanism 30 is located in the lock position, the large diameter section 323 is disposed in the large diameter slot 131; when the limitation mechanism 30 is located in the release position, the small diameter section 324 is disposed in the small diameter slot 132.

Figure 5:
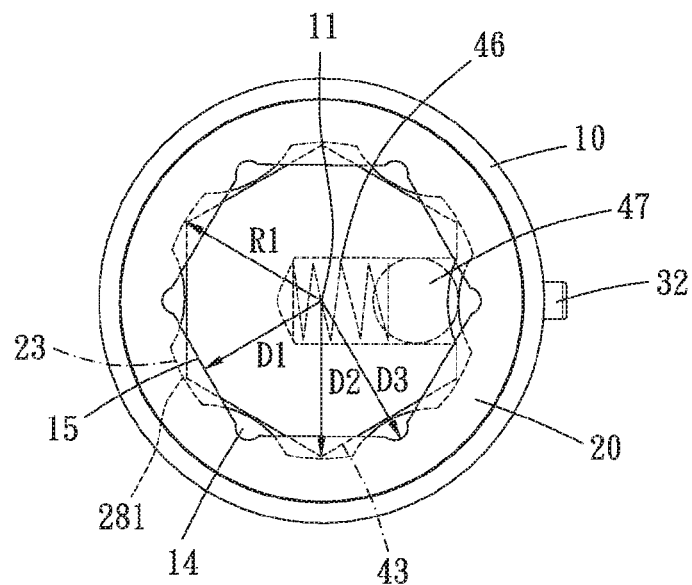
FIGS. 5 and 6 are top plan view and bottom plan view of a driving head-changeable tool according to a preferable embodiment of the present invention.

The inner sleeve 20 has a receiving hole 27 defined by the inner wall of the first connecting end 21, the receiving hole 27 has an opening 28 toward the blocking flanges 15, a periphery 281 of the opening 28 partially overlaps with the blocking flanges 15 axially (as shown in FIG. 5), a largest radial dimension R1 of the opening 28 which is defined from the concave 23 to the central axis 11 is larger than the distance D1 from the blocking flange 15 to the central axis 11. A spring 46 and a ball 47 are received within a driving head 40, the spring 46 abuts against the driving head 40, the ball 47 is radially biased by the spring 46 to abuts against the inner sleeve 20.

The driving head 40 includes a first end 41 and a second end 42 relative to the first end 41. A peripheral face of the first end 41 has a plurality of abutting corner portions 43 extending axially, and the first end 41 is detachably inserted into the first connecting end 21. A largest distance D2 from the abutting corner portion 43 to the central axis 11 is larger than the distance D1 from the blocking flange 15 to the central axis 11, and the largest distance D2 from the abutting corner portion 43 to the central axis 11 is smaller than the largest radial dimension R1 of the opening 28 which is defined from the concave 23 to the central axis 11 (as shown in FIG. 5). In this embodiment, the first end 41 has a polygonal ball head 411 and a radial protruding edge 412. An area between the polygonal ball head 411 and the radial protruding edge 412 is in neck shape. The second end 42 is formed with a quadrangular connecting head 420, and the quadrangular connecting head 420 may be provided for a driving device to connect thereto. The driving device may be an electronic driving device, a pneumatic driving device or a hand tool like an open-ended wrench, a socket wrench or a screwdriver, and the quadrangular connecting head 420 may be provided for adapters, screwdrivers or various drill bits to connect thereto.

Figure 9:
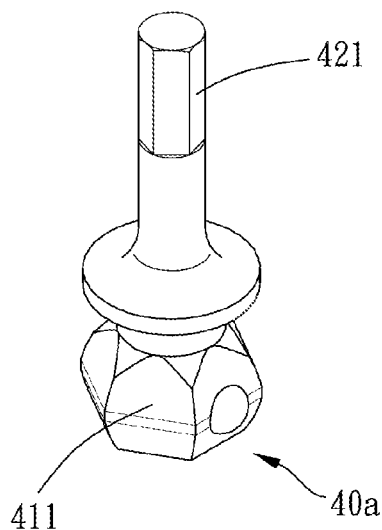
FIGS. 9 to 11 are stereograms of different driving heads.
Figure 10:
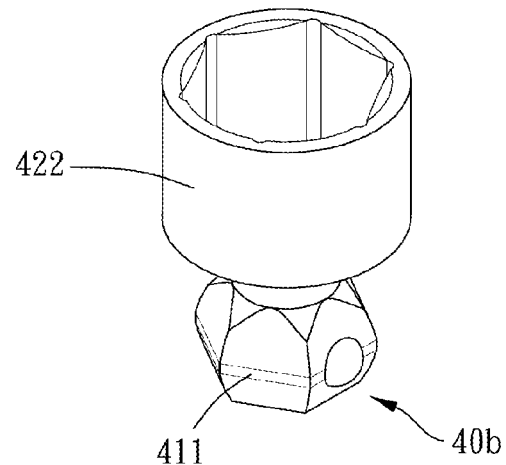

In addition, a driving head 40a of the driving head-changeable tool is shown in an embodiment in FIG. 9, and a second end of the driving head 40a is formed with a hexagonal column 421 (which can act as a hexagonal wrench). It can be noted that a driving head 40b of the driving head-changeable tool is shown in an embodiment in FIG. 10, and a second end of the driving head 40b is formed with a socket 422, but not limited thereto. The second end of the driving head 40b can also be formed with a tool head such as a screwdriver head or a drill bit.

Figure 6:
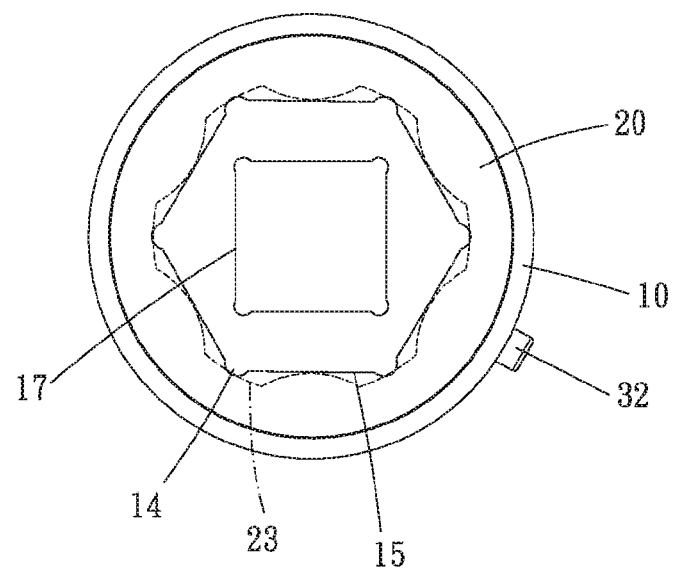
Figure 7:
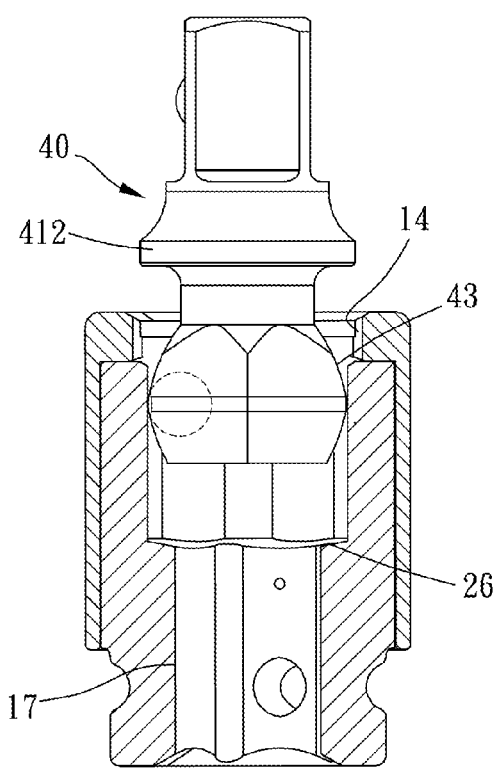
FIGS. 7 and 7A are cross-sectional views showing elongation and retraction of a driving head according to a preferable embodiment of the present invention.
Figure 8:
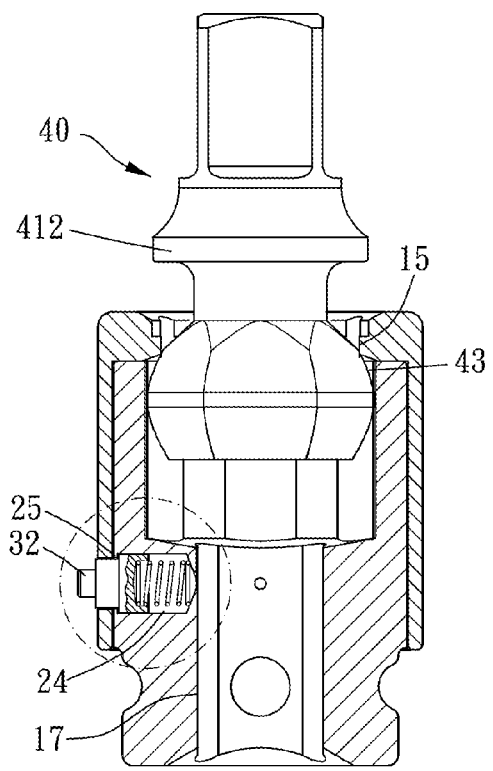
FIG. 8 is a cross-sectional view of a driving head-changeable tool according to a preferable embodiment of the present invention.
Figure 7A:
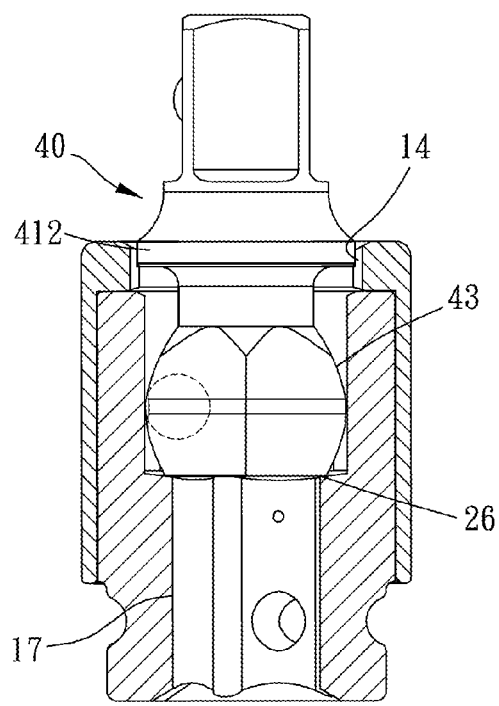
Figure 8A:
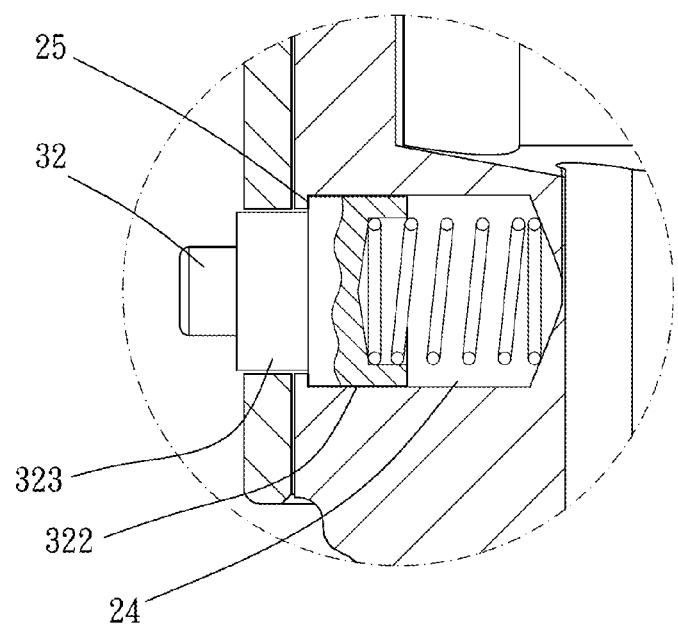
FIG. 8A is an enlarged drawing of FIG. 8, showing arrangement of a limitation mechanism of the driving head-changeable tool.

In actual practice, when the limitation mechanism 30 is located in the lock position, the elastic member 31 is elastically abutted against the operating member 32 to make the large diameter section 323 normally located in the large diameter slot 131 (as shown in FIGS. 1 and 2). The outer sleeve 10 and the inner sleeve 20 are unrotatable relative to each other, wherein, as viewed in the axial direction, each concave 23 overlaps with one of the blocking flanges 15 (as shown in FIGS. 5 and 8); when the operating member 32 is pressed to make the large diameter section 323 disassemble from the large diameter slot 131 and moves the operating member 32 to make the small diameter section 324 located in the small diameter slot 132 (as shown in FIG. 3), the limitation mechanism 30 is located in the release position, the outer sleeve 10 and the inner sleeve 20 are rotatable relative to each other and each concave 23 corresponds to one of the corner portions 14 (as shown in FIGS. 6 and 7).

Taking the driving head 40 having the polygonal ball head 411 and the radial protruding edge 412 for example, when the limitation mechanism 30 is located in the release position and each concave 23 and one of the corner portions 14 correspond to each other, each the abutting corner portion 43 of the driving head 40 is allowed to enter the inner sleeve 20. When the radial protruding edge 412 is abutted against the end peripheral edge 12 (as shown in FIG. 1), the driving head 40 is fixedly constrained by the inner sleeve 20 and the outer sleeve 10 to prevent the driving head 40 from having problems like shaking, poor efficiency or inconvenience to users. When the radial protruding edge 412 is unabutted against the end peripheral edge 12 (as shown in FIG. 2), the driving head 40 is pivotally swingable relative to the inner sleeve 20 and the outer sleeve 10 so as to allow the driving head 40 to be used in spaces which are not accessible easily to mount or dismount fixing members (such as screws or bolts). As viewed in the axial direction, when the limitation mechanism 30 is located in the lock position, each abutting corner portion 43 overlaps with one of the blocking flanges 15 (as shown in FIGS. 5 and 8); therefore, each abutting corner portion 43 is restrictable by the corresponding blocking flange 15, so the driving head 40 cannot disassemble from the inner sleeve 20 easily. Hence, either is the driving head 40 fixedly constrained by the inner sleeve 20 and the outer sleeve 10 or the driving head 40 is pivotally swingable relative to the inner sleeve 20 and the outer sleeve 10, the driving head 40 can be prevented from disassembling from the inner sleeve 20 to avoid problems like poor efficiency, interruption or danger.

Preferably, the inner wall of the first connecting end 21 of the inner sleeve 20 can be formed with a stop face 26 facing the first end 41 of the driving head 40. When the radial protruding edge 412 is abutted against the end peripheral edge 12, the end face of the first end 41 is abutted against the stop face 26 so as to make the driving head 40 connect to the inner sleeve 20 and the outer sleeve 10 more stably and to benefit the application of impact power tools.

Figure 11:
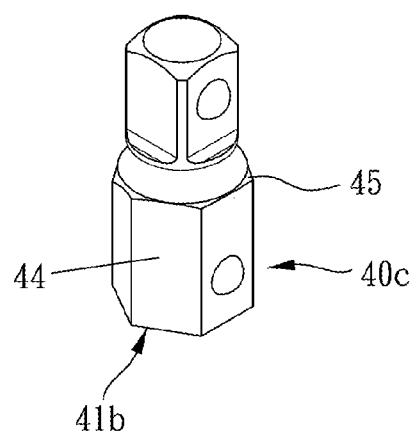

The driving head applicable in the present invention can be in the polygonal ball head mode or like the one shown in FIG. 11. A driving head 40c as shown in FIG. 11 has a straight polygonal rod 44 disposed at a first end 41b. Please refer to FIGS. 5 and 11, as shown in the axial direction, when the limitation mechanism 30 is located in the lock position, each abutting corner portion 45 of the straight polygonal rod 44 overlaps with one of the blocking flanges 15 so as to prevent the driving head 40c from disassembling from the inner sleeve 20.

Give the above, through relative rotation of the outer sleeve and the inner sleeve, the corresponding relation of each blocking flange and each abutting corner portion of a driving head can be changed so as to prevent the driving head from disassembling from the inner sleeve and to make it convenient to change the driving head or the like.

In addition, the driving head of the driving head-changeable tool of the present invention is pivotally swingable relative to the inner sleeve and the outer sleeve so as to allow the driving head to be used in spaces which are not easily accessible and mount or dismount screw members (such as screws or bolts). What is important, each abutting corner portion of the driving head is restrictable by the corresponding blocking flange, so the driving head won't disassemble easily. Therefore, problems like ill efficiency, interruption or danger can be prevented.

Moreover, the driving head-changeable tool of the present invention has advantages such as less components and simple structure, and it is easy to be mounted.

In sum, the inner wall of the first connecting end has a plurality of concaves extending axially, a distance from the concave to the central axis is larger than a distance from the blocking flange to the central axis. The inner sleeve has a receiving hole defined by the inner wall of the first connecting end, the receiving hole has an opening toward the blocking flanges, and a largest radial dimension of the opening which is defined from the concave to the central axis is larger than the distance from the blocking flange to the central axis. As a result, a polygonal ball head of a driving head tool can be inserted, from outside, into the inner sleeve and optionally blocked by the blocking flanges of the outer sleeve or withdrawn from the inner sleeve. Through relative rotation of the outer sleeve and the inner sleeve, the corresponding relation of each blocking flange and each abutting corner portion of a driving head can be changed so as to prevent the driving head from disassembling from the inner sleeve and to make it convenient to change the driving head or the like.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A driving head-changeable tool, including:
   an outer sleeve, having a central axis defined by the outer sleeve, the outer sleeve having an end peripheral edge and a sliding slot circumferentially formed, the end peripheral edge having a plurality of corner portions and a plurality of blocking flanges located between the corner portions, a distance from the corner portion to the central axis being greater than a distance from the blocking flange to the central axis;

an inner sleeve, being rotatably coaxially sleeved by the outer sleeve and having opposite first and second connecting ends along the central axis, an inner wall of the first connecting end having a plurality of concaves extending axially, a distance from the concave to the central axis being larger than a distance from the blocking flange to the central axis;

a limitation mechanism, being mounted to the inner sleeve and extending into the sliding slot, being operable to move relative to the sliding slot between a lock position and a release position;

wherein, as viewed in an axial direction, when the limitation mechanism is located in the lock position, the outer sleeve and the inner sleeve are unrotatable relative to each other and each concave overlaps with one of the blocking flanges; when the limitation mechanism is located in the release position, the outer sleeve and the inner sleeve are rotatable relative to each other and each concave corresponds to one of the corner portions; and wherein the inner sleeve has a receiving hole defined by the inner wall of the first connecting end, the receiving hole has an opening toward the blocking flanges, a periphery of the opening partially overlaps with the blocking flanges axially.

2. The driving head-changeable tool of claim 1, wherein each blocking flange is connected between each two neighboring corner portions transversely and each corner portion is recessed into the end peripheral edge radially relative to the two neighboring blocking flanges.

3. The driving head-changeable tool of claim 1, wherein the inner sleeve is formed with a disposing hole and has a limitation edge which is formed by a hole edge of the disposing hole extending radially inwardly, wherein the limitation mechanism includes an elastic member disposed in the disposing hole and an operating member, wherein a peripheral face of the operating member has a limitation portion, and an end of the operating member is inserted into the disposing hole and abutted against the elastic member and the limitation portion is disposed in the disposing hole and restrictable by the limitation edge.

4. The driving head-changeable tool of claim 3, wherein the operating member hierarchically includes an inserting section, a large diameter section and a small diameter section, a diameter of the inserting section is larger than the large diameter section and forms a stepped portion with the large diameter section, the stepped section acts as the limitation portion, and the inserting section is inserted in the disposing hole.

5. The driving head-changeable tool of claim 1, wherein the sliding slot includes a large diameter slot at one end and a small diameter extending from the large diameter slot, wherein the limitation mechanism includes an operating member disposed in the sliding slot, and the operating member has a large diameter section protruding out of a peripheral face of the inner sleeve and a small diameter section extending from the large diameter section, wherein a diameter of the large diameter section is equal to or smaller than a width of the large diameter slot and is larger than a width of the small diameter slot, and a diameter of the small diameter section is equal to or smaller than the width of the small diameter slot;

wherein as viewed in the axial direction, when the limitation mechanism is located in the lock position, the large diameter section is disposed in the large diameter slot, and when the limitation mechanism is located in the release position, the small diameter section is disposed in the small diameter slot.

6. The driving head-changeable tool of claim 1, wherein the end peripheral edge further includes a circular concave.

7. The driving head-changeable tool of claim 1, further including a driving head, wherein the driving head includes a first end and a second end relative to the first end, the first end has a plurality of abutting corner portions extending axially, the first end is detachably inserted in the first connecting end and a largest distance from the abutting corner portion to the central axis is larger than the distance from the blocking flange to the central axis and smaller than the largest radial dimension of the opening which is defined from the concave to the central axis.

8. The driving head-changeable tool of claim 7, wherein the first end has a polygonal ball head and a radial protruding edge;

wherein when the radial protruding edge is abutted against the end peripheral edge, and the driving head is fixedly constrained by the inner sleeve and the outer sleeve;

wherein when the radial protruding edge is unabutted against the end peripheral edge, and the driving head is pivotally swingable relative to the inner sleeve and the outer sleeve with the polygonal ball head as a pivot;

wherein as view in the axial direction, when the limitation mechanism is located in the lock position, each abutting corner portion overlaps with one of the blocking flanges.

9. The driving head-changeable tool of claim 8, wherein the inner wall of the first connecting end has a stop face facing the first end of the driving head, and when the radial protruding edge is abutted against the end peripheral edge, an end face of the first end is abutted against the stop face.

* * * * *